(No Model.)
J. E. TREAT.
PARALLEL DROP BRACKET FOR GAS, &c.
No. 338,117. Patented Mar. 16, 1886.
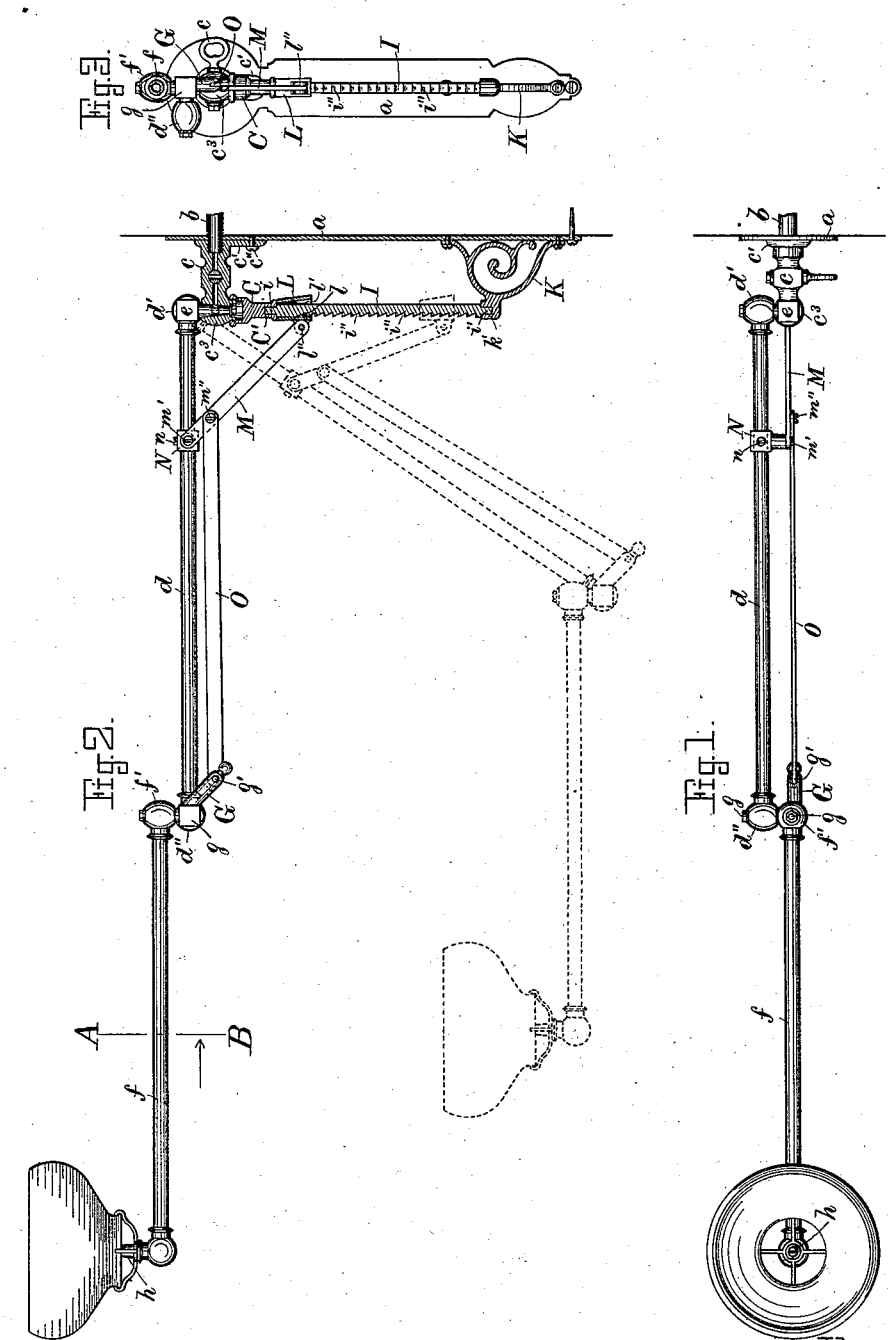
Witnesses
Henry Chadbourn.
M. B. Hinds.
Inventor
James E. Treat.
by Alban Andrén
his atty.

UNITED STATES PATENT OFFICE.

JAMES E. TREAT, OF BOSTON, MASSACHUSETTS.

PARALLEL DROP-BRACKET FOR GAS, &c.

SPECIFICATION forming part of Letters Patent No. 338,117, dated March 16, 1886.

Application filed December 7, 1885. Serial No. 184,925. (No model.)

*To all whom it may concern:*

Be it known that I, JAMES E. TREAT, a citizen of the United States, residing at Boston, in the county of Suffolk and State of Massachusetts, have invented certain new and useful Improvements in Parallel Drop-Brackets for Gas, &c.; and I do hereby declare that the same are fully described in the following specification and illustrated in the accompanying drawings.

This invention relates to improvements in parallel drop-brackets for gas or other purposes—such as, for instance, for adjusting and supporting oil or electric lamps, as an adjustable tool-holder for dentists' use, or for other purposes where it is desirable to quickly adjust the position of the arm or bracket up and down, and to secure it in the desired position after being adjusted. Besides being vertically adjustable, the pipes or arms are hinged together, as is usual on gas-fixtures, so that the drop-bracket can be swung sidewise with perfect freedom in any of its vertical adjusted positions.

The invention is carried out as follows, reference being had to the accompanying drawings, where Figure 1 represents a plan view. Fig. 2 represents a sectional side elevation, and Fig. 3 represents a cross-section on the line A B, shown in Fig. 2.

Similar letters refer to similar parts wherever they occur on the different parts of the drawings.

$a$ is a metal back plate, (or of other material, if so desired,) that is secured to the wall or other object by means of screws or other fastening devices.

If the invention is applied for gas-fixtures, I prefer to make a perforation in the upper end of said plate $a$, through which passes the screw-threaded end of the gas-pipe $b$, to which is screwed the cock $c$, the latter being preferably made with a flange or collar, $c'$, that is secured to plate $a$ by means of a screw, $c''$, Fig. 2, to prevent the fixture from working loose on the gas-pipe $b$, to which the cock is screwed.

To the outer end of cock $c$ is universally jointed the arm or pipe $d$ by means of the angle $e$, the vertical leg of which is journaled in a vertical socket, $c^3$, in the end of cock $c$, and the horizontal leg of said angle $e$ being journaled in a socket, $d'$, on the inner end of arm or pipe $d$, in the usual manner of constructing universal joints for gas-arms. The outer end of arm or pipe $d$ is universally jointed to arm or pipe $f$ by means of angle $g$, having its horizontal leg journaled in a socket, $d''$, secured to outer end of pipe or arm $d$, and its vertical leg journaled in the socket $f'$, secured to pipe or arm $f$, to the outer end of which is secured the gas-burner $h$, or a table, tool-holder, or other device, as may be desired.

To the under side of socket $c^3$ is screwed or otherwise secured the bearing-piece C, the axis of which is arranged in a line with the axis of the vertical bore in said socket $c^3$, as shown in Fig. 2. The lower end of bearing-piece C is provided with a cylindrical vertical recess, C', in which is inserted the upper cylindrical trunnion, $i$, of the ratchet-bar I, the latter having in its lower end the cylindrical trunnion $i'$, supported in and capable of turning in a cylindrical recess, $k'$, in the projection or bracket K, secured in a suitable manner to the plate $a$, as shown in Fig. 2.

The ratchet-bar I is shown as provided with teeth $i''$ $i''$ on one side, and allowed to turn around its vertical axis in the bearings $C'$ $k$; but I do not wish to confine myself to this exact arrangement, for, if so desired, the ratchet-bar I may be made stationary, in which case I make it in the form of a cylindrical rod with annular teeth, grooves, or projections, although in practice I prefer to make it and support it in the manner as above described, and as shown in the drawings.

On the ratchet-bar I is vertically adjustable the locking-sleeve L, provided in front with a tooth or locking projection, $l$, adapted to lock in any of the teeth on the ratchet-bar I, and provided with a spring, $l'$, secured to the rear interior portion of sleeve L, and pressing against the back of ratchet-bar I, as shown in Fig. 2, so as to cause the tooth or projection $l$ to automatically lock in one of the teeth on the ratchet-bar I as soon as the operator releases his hold on said locking-sleeve L.

The internal chamber in sleeve L is preferably made tapering—that is, of proper size in its upper end to fit loosely on the ratchet-bar I, and enlarged sufficiently in its lower end to permit the locking tooth or projection $l$ to be disengaged from the teeth on ratchet-bar I when the operator presses the lower end of sleeve L forward against the influence of spring $l'$.

Any other suitable locking and releasing device may be used in connection with the ratchet-bar I without departing from the essence of my invention; but I prefer to use the one shown and described, as it is very simple in construction, and will automatically lock on the ratchet-bar as soon as the operator lets go the pressure on sleeve L, and thus prevent its accidental dropping.

To the sleeve L is hinged at $l''$ the link or rod M, the upper end of which is hinged at $m'$ to the block N, located on the pipe or bar $d$, and preferably made adjustable thereon, and secured in place by means of a set-screw, $n$, as shown in Figs. 1 and 2.

By making the block N adjustable on pipe or arm $d$ it can be set and secured to such arm in its proper position, so as to compensate for any inaccuracy in the lengths of links O and M, or either of them, so as to obtain a horizontal, or nearly so, position of the outer arm, $f$.

O is a link or connecting-rod arranged parallel, or nearly so, with and below the pipe or bar $d$, its rear end being hinged at $m''$ to the link M, at a place between the fulcra $l''$ and $m'$, as shown in Fig. 2. The forward end of connecting-rod O is hinged at $g'$ to a lever or projection, G, secured to or made in one piece with the angle-piece $g$, as shown.

The full lines in Fig. 2 show the fixture in a horizontal, or nearly so, position. In dotted lines in said figure the arm or pipe $d$ is shown as dropped more or less, as may be desired, leaving the outer pipe or bar, $f$, in a horizontal, or nearly so, position.

As the bearings for the ratchet-bar I are located centrally below the socket $c^3$, it will be readily understood that the arm $d$ can be swung to the right or left with perfect ease, whether the fixture is in its highest, lowest, or intermediate position. It will also be noticed that the arm $f$ may be swung to the right or left with the arm $d$, or independent of it, as may be desired, in any position of the latter.

If the fixture is in the position shown in full lines in Fig. 2, and it is desired to lower it, all that is necessary to do is to press forward on the rear of the lower portion of sleeve L against the influence of spring $l'$ until the pin or projection $l$ is carried free of the teeth $i''$, when the arm $d$ will be caused to swing downward by its own weight on the horizontal leg of angle $e$ until the desired inclination is reached, when the pin $l$ will automatically lock in one of the teeth on the ratchet-bar I as soon as the operator relieves his pressure on the rear of the sleeve L. During such downward motion of sleeve L the rod O is gradually moved outward by its connection to link M, and in so doing it turns the angle $g$ on its horizontal leg, so as to retain the pipe or arm $f$ in a horizontal, or nearly so, position, no matter how much the arm $d$ is swung up or down, as limited by the sleeve L on the bar I.

The pipe or arm $f$ is raised by releasing sleeve L from ratchet I and raising sleeve L to the desired position, where it is automatically secured as soon as the operator releases his hold on sleeve L.

Having thus fully described the nature, construction, and operation of my invention, I wish to secure by Letters Patent, and claim—

1. The combination of a supporting-plate, $a$, having a stationary socket, $c^3$, and a bracket, K, a locking-bar, I, supported thereby, the inner arm, $d$, joined to said socket, the outer arm, $f$, jointed to the inner arm and having an attached lever, G, a link, O, connected at one end with said lever, the link M, connected intermediate its ends to the link, a locking-sleeve, L, located on the locking-bar and connected with one end of the link M, and a sliding connection between the other end of the latter link and the inner jointed arm, substantially as described.

2. In a bracket, the stationary socket $c^3$, and the locking-bar I, arranged centrally below it and provided with locking device L, combined with the link M, hinged to such locking device and to the arm $d$, in a manner and for the purpose as set forth.

3. The combination, in a bracket, of a supporting-plate, $a$, a locking-bar, I, supported thereby, the inner arm, $d$, having a jointed connection with the plate, the outer arm, $f$, jointed to said inner arm, the lever G, connecting-link O, link M, and locking device L, connected with the latter and arranged on the locking-bar, substantially as described.

4. The combination of the stationary socket $c^3$, the locking-bar I, the adjustable locking-sleeve L thereon, the arm $d$, jointed to said socket, the movable block N on said arm, and the link M, connected with the block and the locking-sleeve, substantially as described.

5. The combination of the stationary socket $c^3$, the bracket K, the locking-bar I, supported by said parts, the locking-sleeve on the bar, the inner arm, $d$, jointed to the socket, the link M, connected with the sleeve and having a sliding connection with the inner arm, the outer arm, $f$, hinged to the inner arm and having the attached lever G, and the link O, connecting said lever with the link M, substantially as described.

In testimony whereof I have affixed my signature in presence of two witnesses.

JAMES E. TREAT.

Witnesses:
 ALBAN ANDRÉN,
 HENRY CHADBOURN.